United States Patent [19]
Ashcroft et al.

[11] Patent Number: 5,894,899
[45] Date of Patent: Apr. 20, 1999

[54] SPEED RANGE CONTROL SYSTEM FOR A SKID STEER LOADER

[75] Inventors: Dale A. Ashcroft, New Holland; Clayton E. Banks, Jr., Brownstown, both of Pa.

[73] Assignee: New Holland North America, Inc., New Holland, Pa.

[21] Appl. No.: 08/734,892

[22] Filed: Oct. 22, 1996

Related U.S. Application Data

[60] Provisional application No. 60/007,067, Oct. 25, 1995.

[51] Int. Cl.$^6$ .................................................. B62D 11/00
[52] U.S. Cl. ......................... 180/6.48; 180/307; 180/308
[58] Field of Search ........................... 180/307, 308, 180/6.48, 367, 333; 60/419

[56] References Cited

U.S. PATENT DOCUMENTS

| | | | |
|---|---|---|---|
| 3,215,192 | 11/1965 | Halls . | |
| 3,246,715 | 4/1966 | Pool et al. | 180/308 |
| 3,351,147 | 11/1967 | Williamson | 180/307 |
| 3,443,656 | 5/1969 | Stolz | 180/307 |
| 3,461,669 | 8/1969 | Kanengieter | 180/307 |
| 3,817,341 | 6/1974 | Greene | 180/307 |
| 3,994,353 | 11/1976 | Greene | 180/307 |
| 4,074,782 | 2/1978 | Bauer | 180/6.48 |
| 4,373,600 | 2/1983 | Buschbom et al. | 180/307 |

OTHER PUBLICATIONS

Sperry New Holland Service Parts Catalog for Model L-781, L-784, and L-785 Skid Steer Loaders.

*Primary Examiner*—Robert J. Oberleitner
*Assistant Examiner*—Michael Cuff
*Attorney, Agent, or Firm*—Frank A. Seemar; Larry W. Miller; J. William Stader

[57] ABSTRACT

A skid steer loader having a main frame supported on four wheels, and a cab with upwardly extending side walls mounted on the main frame for providing an area in which an operator can control the loader. The loader is propelled by an engine operatively coupled to the wheels by a first assembly of suitable control components. A boom structure comprising a pair of arms and a mounting assembly is also mounted on the frame. A second assembly of suitable components is also coupled to the engine to provide appropriate control of the boom structure for raising and lowering the pair of arms. The first assembly of control components includes a pair of hydraulic motors for driving the wheels, and a system associated with the motors for selectively changing the speed ranges of the motors to change the speed at which the wheels propel the loader.

5 Claims, 4 Drawing Sheets

SPEED RANGE CONTROL SYSTEM FOR A SKID STEER LOADER

This application claims the benefit of U.S. Provisional Application No. 60/007,067, filed Oct. 25, 1995.

FIELD OF THE INVENTION

The present invention relates generally to skid steer loaders and more particularly to a control system for a dual speed range hydrostatic transmission used on skid steer loaders type vehicles.

BACKGROUND OF THE INVENTION

Over the years skid steer loaders have been known as agile, compact vehicles with a high degree of maneuverability and a wide range of applications in the agricultural, industrial and construction fields. These vehicles usually include an engine, a boom assembly and an operators compartment mounted on a frame supported by four wheels. Coupled to the engine are a main drive system and a lift system for the boom assembly. The vehicle is maneuvered by driving the wheels on one side at a different speed and/or in a different direction from those on the other side resulting in a turning motion, the severity of which is determined by the relative speeds.

Typically the engine, which is rear mounted for counterbalancing effect, drives a pair of hydrostatic pumps coupled to left and right mounted hydrostatic motors. Wheels on the left and right sides of the vehicle are driven by the left and right mounted motors through gears, chains and sprockets. In one known control arrangement, motion is controlled by an operator seated within the operators compartment by moving a pair of hand operated control levers which are linked to the pumps. The extent to which each lever is moved in a forward direction from a neutral position controls the amount of fluid supplied in a forward direction to its respective motor, and therefore the speed at which the wheels on that side of the vehicle will rotate. Similarly, the extent to which a lever is moved in the reverse direction from the neutral position will control the speed at which the associated wheels rotate in the reverse direction.

As mentioned above, skid steer loaders include a boom assembly. This assembly generally comprises a pair of lift arms and means for mounting the arms on the main frame. Attachments are usually operatively associated with the front of the lift arms. A separate hydraulic system is used to actuate the boom assembly via hydraulic lift cylinders which drive the lift arms. This system is also used to actuate one or two tilt cylinders which pivot the attachment with respect to the lift arms. In the control arrangement mentioned above, a pair of foot pedals conveniently located in the lower front area of the operator compartment control the flow of hydraulic fluid from a hydraulic pump to the lift and tilt cylinders.

In addition to material handling buckets, various other attachments such as snow blowers, trenchers, tree spades and augers which include their own hydraulic motors are commonly mounted to the boom assembly. An auxiliary hydraulic system is used to control the flow of hydraulic fluid between the hydraulic pump and the hydraulic motor of the front mounted attachment. It is common in prior art systems, using the arrangement mentioned above, for the flow of hydraulic fluid to the motor to be controlled by an auxiliary spool valve through actuation of a pivotally mounted handle on one of the control levers. The handle is normally biased to a neutral position. Pushing the handle (relative to the lever on which it is mounted) in one direction strokes the auxiliary valve in a first direction, thereby causing hydraulic fluid to flow to the front mounted attachment in a first direction. Pushing the handle in the opposite direction strokes the auxiliary valve so as to supply fluid in a reverse direction.

In an alternative prior art control arrangement, flow of hydraulic fluid to the lift and tilt cylinders is controlled by a pair of handles on the control levers. Movement of one handle relative to its respective lever controls the boom lift cylinders and movement of the other handle relative to its respective lever controls the bucket tilt cylinders. In this arrangement, if an auxiliary hydraulic system is used for controlling a hydraulic motor or cylinder for mounted attachments, then a foot pedal is utilized for operator actuation.

Further, with respect to prior art skid steer loaders, it has been found to be advantageous to employ a system that permits the vehicle to operate in high and low speed ranges. For example, when filling the bucket, maximum wheel torque is necessary for effective operation in most conditions. Therefore, a low range of speeds is most useful in this phase of the operation. But, when the dump site is situated a significant distance from the work site, as it often is, a higher range of speeds for transport is desirable, which thereby provides an obvious enhancement to the overall effectiveness of the vehicle. At the dump site the operator may wish to drop back to a lower range for maximum control when simultaneously raising the boom and dumping, such as when approaching and dumping into a truck. Finally, upon completion of such dumping task, the operator can shift back to the high range for travel back to the work site.

An assembly used in a system of the type described above, is illustrated on page 31 of Sperry New Holland Service Parts Catalog for Model L-781, L-784 and L-785 Skid Steer Loaders (1985), printed in U.S.A. and identified by catalog no. 5078132. In this arrangement an operating lever, located in the operator's cab, is coupled to a shaft assembly that moves the hydrostatic motor pintle shafts. When the lever is moved from a first position to a second position, the shaft assembly moves the pintle shafts from a high speed operating mode to a low speed operating mode.

Notwithstanding the successful operation of this prior art system, embodied in various models of skid steer loader vehicles manufactured and sold by the predecessor company of the assignee of the present application, applicants have embraced various needs and problems of that system. The below described invention is a new and useful solution that meets the needs of such prior art system, as well as other systems with similar demands, in a manner not heretofore known.

SUMMARY OF INVENTION

An important object of the present invention is to provide a new and improved speed range control system for skid steer loaders that enhances the capability of smooth on-the-go shifting without affecting the reliability and overall performance of the loader.

In pursuance of this and other important objects the present invention provides for new and useful improvements to a skid steer loader having a main frame supported on four wheels, an operator cab mounted on the main frame, the cab including side walls extending upwardly from the main frame to define an operator control area therebetween, a boom structure comprising a pair of arms and a mounting assembly, the arms being supported on the frame by the mounting assembly, power means comprising an engine, first control means operatively coupling the engine to the wheels for propelling the loader, and second control means operatively coupling the engine to the boom structure for raising and lowering the pair of arms, the first control means including first and second variable displacement piston motors for driving the wheels, the motors having two positive displacement stops corresponding to two speed ranges, the first control means further including a system associated with the motors for selectively changing the speed ranges of the wheels to change the speed at which the wheels propel the loader. More particularly, the invention contemplates a linkage assembly comprising a first link arm coupled to the first motor and a second link arm coupled to the second motor, and unique means for pivoting the first and second link arms in concert from a first position to a second position corresponding respectively to a low speed range and a high speed range in a manner that improves the overall performance of the loader.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
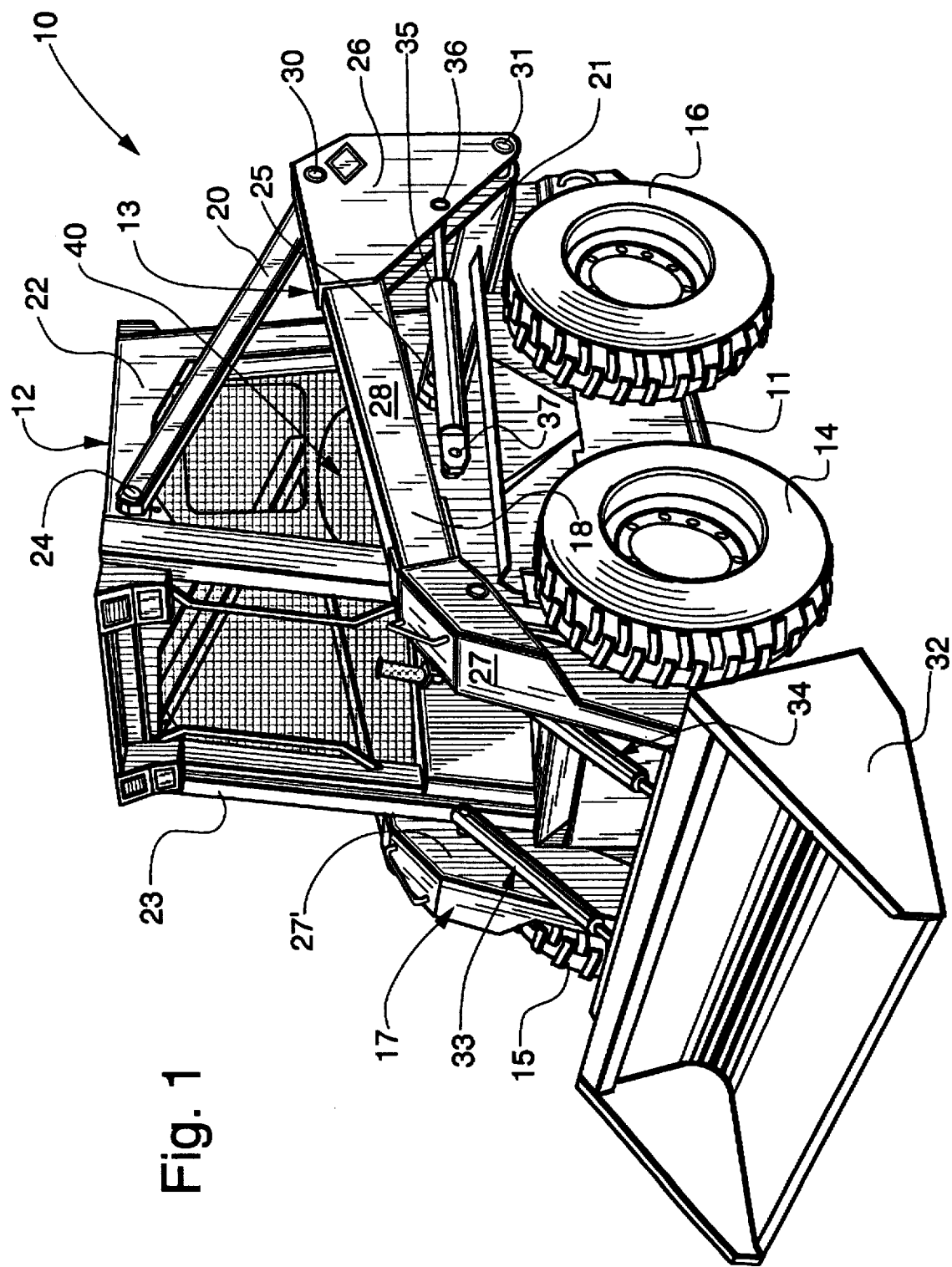
FIG. 1 is a perspective view taken from the left front of a skid steer loader of the type in which the present invention is readily incorporated.

Referring now to the drawings for a more detailed description of the present invention, FIG. 1 shows a skid steer loader 10, which utilizes a four bar linkage system of the type generally disclosed in U.S. Pat. No. 3,215,292, issued Nov. 2, 1965 in the name of L. M. Halls, hereby incorporated by reference. Loader 10 includes a main frame 11, a cab 12 and a boom assembly 13, all of which are supported by a pair of front wheels 14, 15 and a pair of rear wheels (only the left one of which, designated by reference numeral 16, in shown in FIG. 1) mounted on axles (not shown) extending from main frame 11.

A pair of lift arms 17, 18 are swingably mounted via upper links 20 and lower links 21 to load supporting side walls 22, 23 of cab 12 via pivots 24 and 25, respectively. For convenience, because the elements on one side of skid steer loader 10 are paired with similar elements on the other side, only one side of the boom assembly mounting structure will be described in most instances in the following description. Each lift arm, comprises a rear portion 26, a forward portion 27, 27' and an intermediate integral portion 28. The arms are mounted via upper link 20 and lower link 21 at pivots 30 and 31, respectively, in the rear portion 26 thereof.

Pivotally mounted to the forward portion 27, 27' of lift arms 17, 18 is an attachment such as a material handling bucket 32 rotatable with respect to the lift arms in a known manner by means of hydraulic tilt cylinders 33, 34. The boom assembly and bucket 32 are raised and lowered in concert by means of a pair of hydraulic cylinders 35, each of which is pivotally mounted to the rear portion 26 of lift arm 17 at a pivot 36 and to side wall 22 at pivot 37.

An operator's seat 40, enclosed within cab 12 by side walls 22, 23 and a rear wall, is mounted for convenient access to left and right hand control levers and left and right foot pedals. The hand control assemblies are coupled to a pair of hydrostatic pumps which are driven by an engine. Each pump is coupled to an associated hydrostatic motor for driving front wheels 14, 15 and rear wheels 16 in a well known manner. Thus, for and aft reciprocation of the control levers is translated to motion of control means which in turn control the respective hydrostatic pumps that operate the propulsion system.

Figure 2:
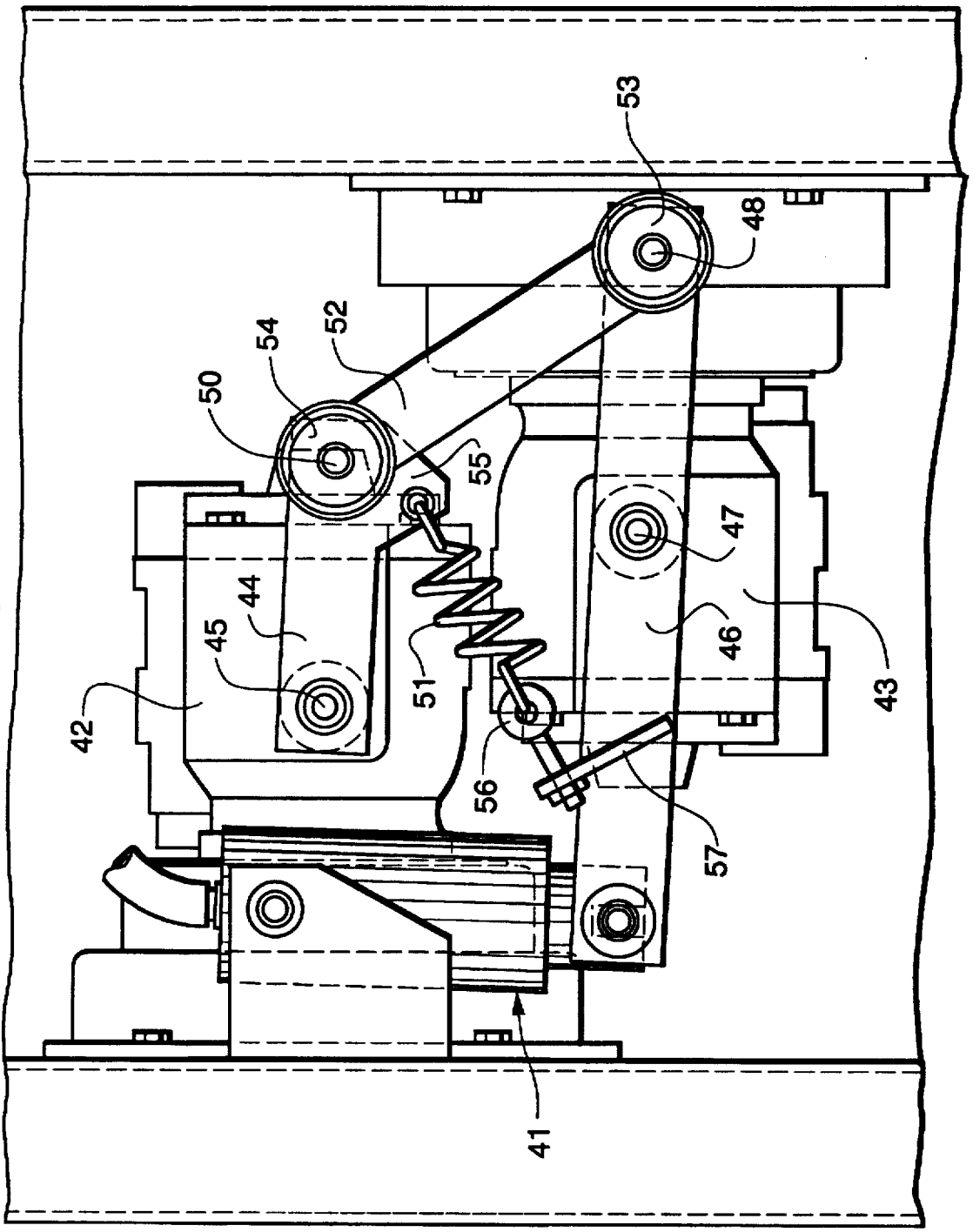
FIG. 2 is a fragmentary plan view of a portion of the loader of FIG. 1 located below the operator's seat.
Figure 3:
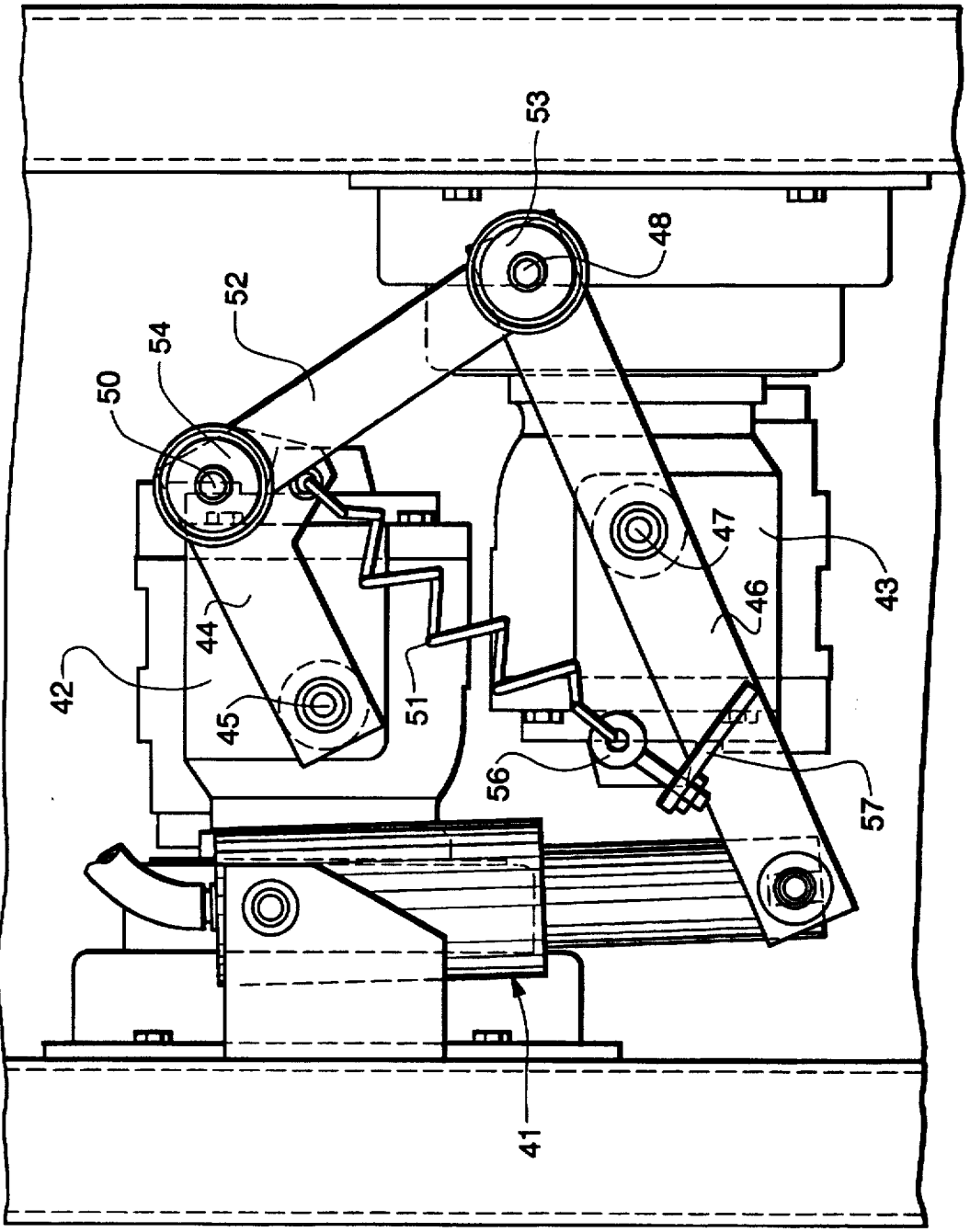
FIG. 3 is a view similar to FIG. 2 but with certain parts shown in the second of two principle operating positions.

FIGS. 2 and 3 depict a control system having a mechanical linkage assembly shown in respective high and low speed range conditions. The system has a single acting hydraulic cylinder 41 attached to a mechanical linkage assembly and powered by machine charge pressure. Variable displacement piston motors 42, 43 are employed in the system, both with identical two positive displacement stops corresponding to high and low ranges. It is important that the cam plates in both motors are held securely against their respective stops in both ranges, to assure smooth flow and avoid chatter. This avoids wear and undesireable noise caused by inefficient operation.

In the control system of FIGS. 2 and 3, link arm 44 is attached to one motor cam plate via pintle arm 45, and link arm 46 is attached to the other motor cam plate via pintle arm 47. The length of the segment of arm 46 from pintle arm 47 to pivot 50 is longer than the length of arm 44 from pintle arm 45 to pivot 50. This results in a stroke for arm 46 that always exceeds the stroke for arm 44, as discussed below. Arms 44 and 46 are coupled by spring 51 and a connecting link 52, pivotally affixed at pivots 48 and 50, via compression bushings 53, 54. Link 52 acts as a compression link with sufficient force generated by the compression of the bushings to securely hold arm 44 such that the internal cam plate is maintained tightly against its stop in all conditions during high range of operation, illustrated by the position of the components of the assembly in FIG. 3, as explained in further detail in the below description of operation. Spring 51 extends between arms 44 and 46, which arms are attached to pintle arms 45, 47 for changing the displacement of associated motors 42, 43 in the hydrostatic drive, as mentioned above. More specifically, spring 51 is secured to integral tab portion 55 of arm 44, and an eye bolt 56 adjustably secured to arm 57, which latter arm 57 is affixed to arm 46.

Figure 4:
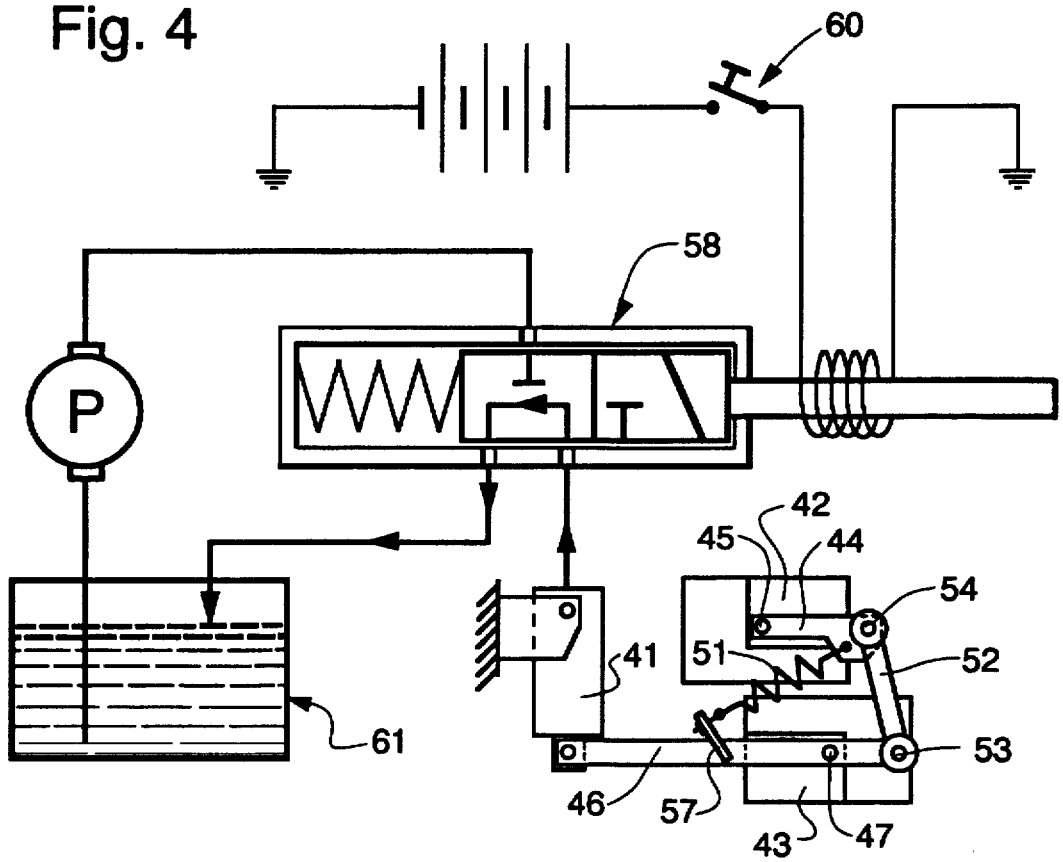
FIG. 4 is a schematic drawing in which hydraulic, mechanical, and electrical components are interrelated in the first of two operative positions.
Figure 5:
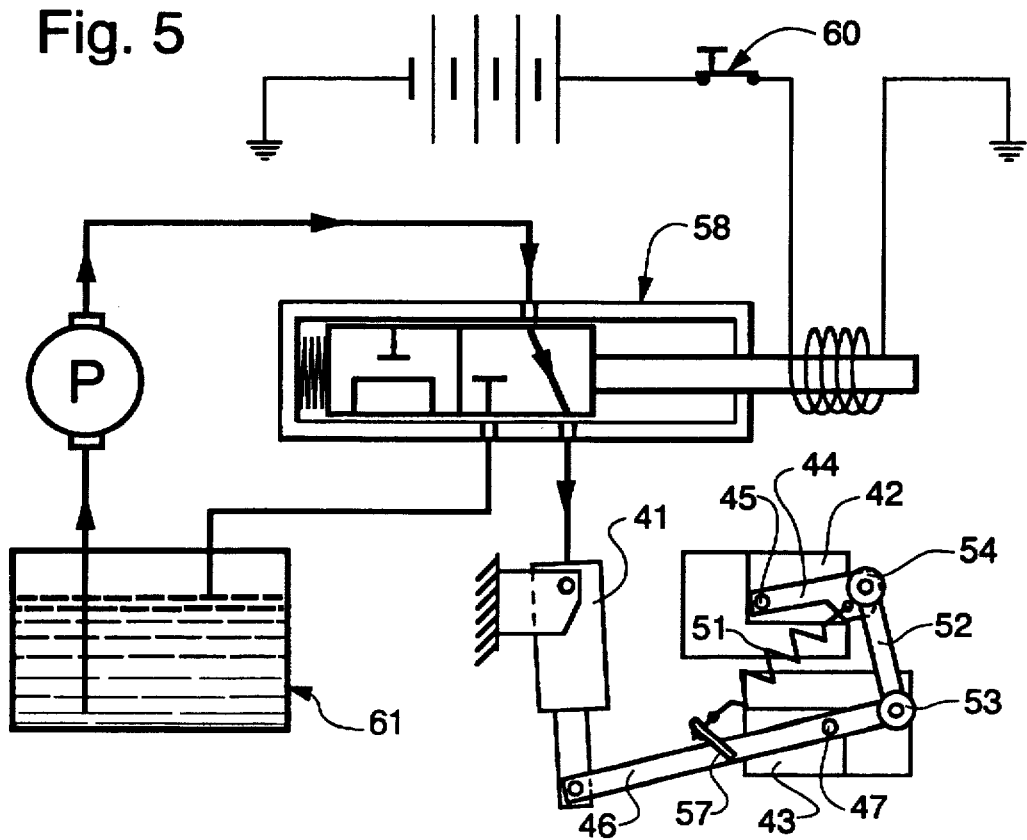
FIG. 5 is also a schematic drawing, similar to FIG. 4, in which the hydraulic, mechanical, and electrical components are interrelated in the second of two operative positions.

Now turning to FIGS. 4 and 5, a schematic diagram shows the hydraulic, mechanical and electrical components of the control system in the high and low ranges conditions. A standard solenoid valve, generally designated by reference numeral 58, controlled in a conventional manner by a switch 60 in the operator control lever handle. The valve diverts pressurized oil to the cylinder when high range is desired (FIG. 5) and relieves the cylinder to tank 61 when low range is desired (FIG. 4). Spring 51 returns the mechanism to the low range, or "home", position when the engine is not running.

In operation, pressurized oil is supplied via valve 58 to open cylinder 41 which overcomes the spring force, provided by spring 51, to pivot the entire linkage assembly from its home position, or low range, to the high range position resulting from displacing both cam plates via link arms 44, 46, and pintles 45 and 47. Both plates are concurrently held snugly against their respective positive displacement stops. This is achieved by the inherent resiliency characteristics of rubber bushings 54, 53, which take up the slack as the short lever arm 44 causes initial contact between its corresponding high range stop and plate, followed by the subsequent contact between the high range stop and plate of motor 43. This maintains both plates simultaneously tight against their internal stops for smooth flow and therefor effective and efficient operation. This high range is so maintained until the cylinder is closed (FIG. 4) whereupon spring 51 pulls the assembly back to the home position, returning the cam plates to the low range stops.

Of the many implicit and explicit advantages of the present invention one of the most important is the provision of a unique control system which effects the changing of speed ranges in a skid steer loader on-the-go by toggling a switch conveniently located on the control lever handle. The system enhances operation with a simple design requiring minimum adjustments. Further, in view of the simplicity of the system, there are inherent cost advantages, especially when compared to servo systems designed to accomplish the same function, as well as attendant improvements in the serviceability.

While preferred structure in which the principles of the present invention are shown and described above, it is to be understood that the invention is not limited to such structure, but that, in fact, widely different means of varying scope and configuration may be employed in the practice of the invention.

Having thus described the invention, what is claimed is:

1. In a vehicle comprising a main frame supported on four wheels, power means comprising an engine, first control means operatively coupling said engine to said wheels for propelling said vehicle, said first control means including first and second variable displacement piston motors for driving said wheels, said motors having high and low speed ranges, said first control means also including first and second pintle arms having first and second positions corresponding to said high and low speed ranges of said motors, said first control means further including a system associated with said motors for selectively changing said speed ranges of said wheels to change the speed at which said wheels propel said vehicle, the improvement comprising a linkage assembly comprising a first link arm coupled to said first motor and a second link arm coupled to said second motor, means for pivoting said first and second link arms in concert from a first position to a second position corresponding respectively to said low speed range and said high speed range, said first link arm affixed to said first pintle arm and said second link arm is affixed to said second pintle arm, whereby said link arms move said pintle arms in concert between said first and second positions, said linkage assembly further comprising an intermediate link attached between said first and said second link arms, said intermediate link being pivotally coupled to said first and second link arms, said means for pivoting comprising a hydraulic cylinder coupled to one of said first and second link arms, said cylinder operable when activated for driving said assembly from said first position to said second position, and said linkage assembly further comprises a spring attached between said first link arm and said second link arm to return said assembly to its first position under conditions where said hydraulic cylinder is not activated.

2. In a skid steer loader as set forth in claim 1 wherein the length of the first link arm between the first pintle arm and said intermediate link is less than the length of the second link arm between the second pintle arm and said intermediate link, whereby the first pintle arm reaches its position corresponding to before the second pintle arm reaches its position corresponding to the high range of its respective motor.

3. In a vehicle comprising a main frame supported on four wheels, power means comprising an engine, first control means operatively coupling said engine to said wheels for propelling said vehicle, said first control means including first and second variable displacement piston motors for driving said wheels, said motors having high and low speed ranges, said first control means also including first and second pintle arms having first and second positions corresponding to said high and low speed ranges of said motors, said first control means further including a system associated with said motors for selectively changing said speed ranges of said wheels to change the speed at which said wheels propel said vehicle, the improvement comprising a linkage assembly comprising a first link arm coupled to said first motor and a second link arm coupled to said second motor, means for pivoting said first and second link arms in concert from a first position to a second position corresponding respectively to said low speed range and said high speed range, said first link arm affixed to said first pintle arm and said second link arm is affixed to said second pintle arm, whereby said link arms move said pintle arms in concert between said first and second positions, said linkage assembly further comprising an intermediate link attached between said first and said second link arms, said intermediate link being pivotally coupled to said first and second link arms, said means for pivoting comprising a hydraulic cylinder coupled to one of said first and second link arms, said cylinder operable when activated for driving said assembly from said first position to said second position, and said intermediate link coupled to said first and said second link arms by resilient means.

4. In a skid steer loader as set forth in claim 3 wherein the length of the first link arm between the first pintle arm and said intermediate link is less than the length of the second link arm between the second pintle arm and said intermediate link, whereby the first pintle arm reaches its position corresponding to the high range of its respective motor before the second pintle arm reaches its position corresponding to the high range of its respective motor.

5. In a vehicle comprising a main frame supported on four wheels, power means comprising an engine, first control means operatively coupling said engine to said wheels for propelling said vehicle, said first control means including first and second variable displacement piston motors for driving said wheels, said motors having high and low speed ranges, said first control means also including first and second pintle arms having first and second positions corresponding to said high and low speed ranges of said motors, said first control means further including a system associated with said motors for selectively changing said speed ranges of said wheels to change the speed at which said wheels propel said vehicle, the improvement comprising a linkage assembly comprising a first link arm coupled to said first motor and a second link arm coupled to said second motor, means for pivoting said first and second link arms in concert from a first position to a second position corresponding respectively to said low speed range and said high speed range, said first link arm affixed to said first pintle arm and said second link arm is affixed to said second pintle arm, whereby said link arms move said pintle arms in concert between said first and second positions, said linkage assembly further comprising an intermediate link attached between said first and said second link arms, said intermediate link being pivotally coupled to said first and second link arms, said means for pivoting comprising a hydraulic cylinder coupled to one of said first and second link arms, said cylinder operable when activated for driving said assembly from said first position to said second position, and the length of the first link arm between the first pintle arm and said intermediate link being less than the length of the second link arm between the second pintle arm and said intermediate link, whereby the first pintle arm reaches its position corresponding to the high range of its respective motor before the second pintle arm reaches its position corresponding to the high range of its respective motor.

* * * * *